United States Patent
Shiao et al.

(10) Patent No.: US 10,443,241 B2
(45) Date of Patent: Oct. 15, 2019

(54) SOLAR HEAT-REFLECTIVE ROOFING GRANULES, SOLAR HEAT-REFLECTIVE SHINGLES, AND PROCESS FOR PRODUCING SAME

(71) Applicant: CertainTeed Corporation, Malvern, PA (US)

(72) Inventors: Ming Liang Shiao, Collegeville, PA (US); Keith C. Hong, Litiz, PA (US); Husnu M. Kalkanoglu, Swarthmore, PA (US); Gregory F. Jacobs, Oreland, PA (US)

(73) Assignee: CertainTeed Corporation, Malvern, PA (US)

( * ) Notice: Subject to any disclaimer, the term of this patent is extended or adjusted under 35 U.S.C. 154(b) by 0 days.

(21) Appl. No.: 15/896,981

(22) Filed: Feb. 14, 2018

(65) Prior Publication Data

US 2018/0171637 A1 Jun. 21, 2018

Related U.S. Application Data

(63) Continuation of application No. 13/723,559, filed on Dec. 21, 2012, now abandoned, which is a continuation of application No. 12/057,131, filed on Mar. 27, 2008, now Pat. No. 8,361,597.

(60) Provisional application No. 60/909,892, filed on Apr. 3, 2007, provisional application No. 60/909,616, filed on Apr. 2, 2007.

(51) Int. Cl.
*C04B 20/12* (2006.01)
*E04D 7/00* (2006.01)
*C09C 3/06* (2006.01)
*C04B 111/00* (2006.01)
*C04B 111/80* (2006.01)

(52) U.S. Cl.
CPC .............. *E04D 7/005* (2013.01); *C04B 20/12* (2013.01); *C09C 3/063* (2013.01); *C01P 2006/62* (2013.01); *C04B 2111/00586* (2013.01); *C04B 2111/80* (2013.01); *Y02W 30/94* (2015.05); *Y10T 428/2438* (2015.01); *Y10T 428/24355* (2015.01); *Y10T 428/24364* (2015.01); *Y10T 428/24372* (2015.01); *Y10T 428/2982* (2015.01); *Y10T 428/2991* (2015.01); *Y10T 428/2993* (2015.01); *Y10T 428/2996* (2015.01)

(58) Field of Classification Search
CPC ..... E04D 7/005; C04B 20/12; C04B 2111/80; C04B 2111/00586; C09C 3/063; Y02W 30/94; Y10T 428/2438; Y10T 428/24355; Y10T 428/24364; Y10T 428/24372; Y10T 428/2993; Y10T 428/2991; Y10T 428/2982; Y10T 428/2996; C01P 2006/62
See application file for complete search history.

(56) References Cited

U.S. PATENT DOCUMENTS

2004/0120884 A1* 6/2004 Sherman .............. B01J 13/0047
  423/608
2005/0072114 A1* 4/2005 Shiao ........................ E04D 5/12
  52/782.1

* cited by examiner

*Primary Examiner* — Nathan L Van Sell
(74) *Attorney, Agent, or Firm* — McDonnell Boehnen Hulbert & Berghoff LLP

(57) ABSTRACT

Solar-reflective roofing granules having improved solar heat-resistance are formed by coating colored mineral particles with a coating composition including titanium dioxide nanoparticles.

20 Claims, 1 Drawing Sheet

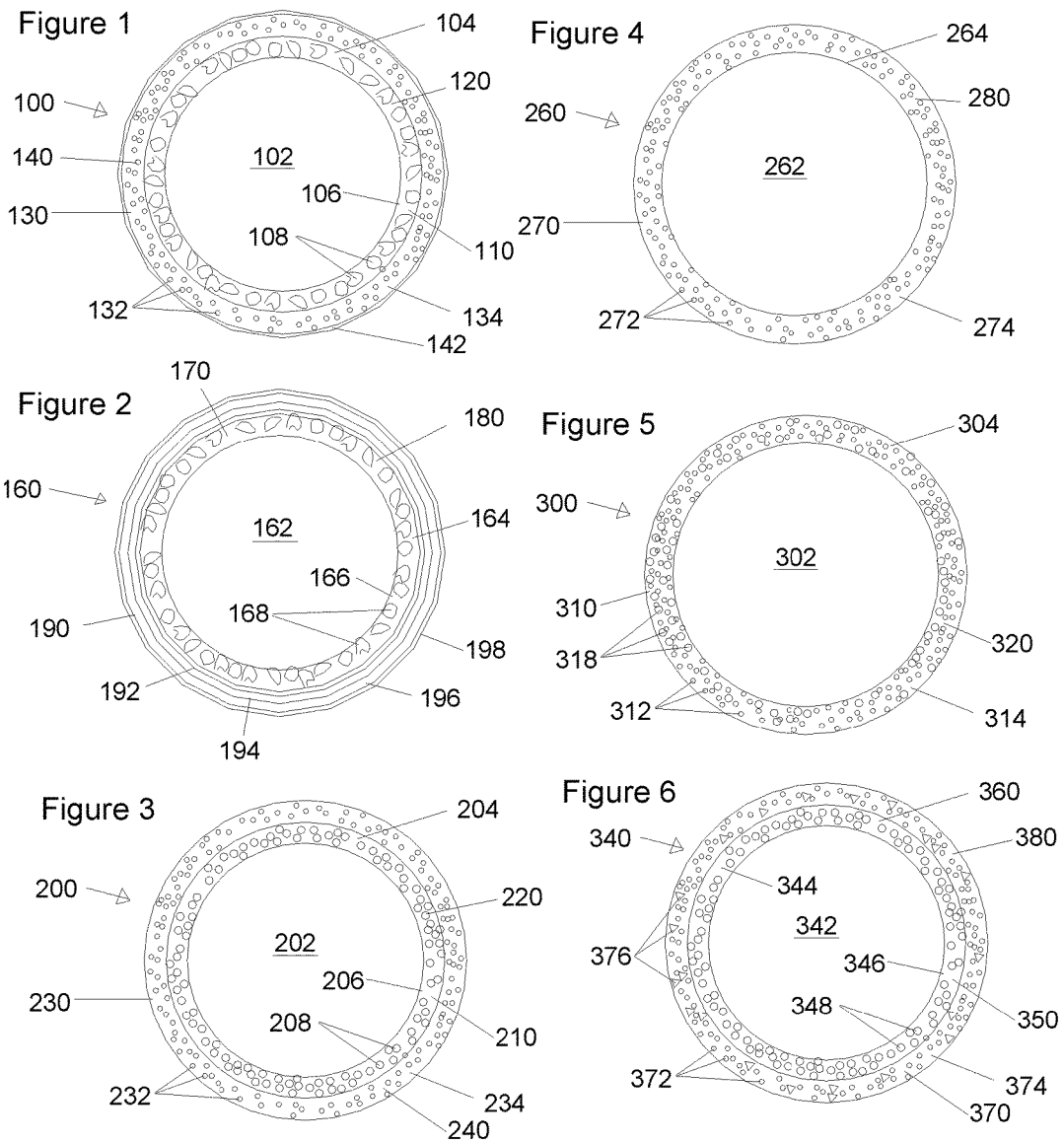

SOLAR HEAT-REFLECTIVE ROOFING GRANULES, SOLAR HEAT-REFLECTIVE SHINGLES, AND PROCESS FOR PRODUCING SAME

CROSS-REFERENCE TO RELATED APPLICATIONS

This application is a continuation of U.S. patent application Ser. No. 13/723,559, filed Dec. 21, 2012, which is hereby incorporated by reference herein in its entirety and which is a continuation of U.S. patent application Ser. No. 12/057,131, filed Mar. 27, 2008, now U.S. Pat. No. 8,361, 597 B2, which claimed the priority of U.S. Provisional Patent Application No. 60/909,892, filed Apr. 3, 2007 and U.S. Provisional Patent Application No. 60/909,616, filed Apr. 2, 2007.

BACKGROUND OF THE INVENTION

1. Field of the Invention

The present invention relates to asphalt roofing shingles, and protective granules for such shingles, and processes for making such granules and shingles.

2. Brief Description of the Prior Art

Pigment-coated mineral rocks are commonly used as color granules in roofing applications to provide aesthetic as well as protective functions to the asphalt shingles. Roofing granules are generally used in asphalt shingle or in roofing membranes to protect asphalt from harmful ultraviolet radiation.

Roofing granules typically comprise crushed and screened mineral materials, which are subsequently coated with a binder containing one or more coloring pigments, such as suitable metal oxides. The binder can be a soluble alkaline silicate that is subsequently insolubilized by heat or by chemical reaction, such as by reaction between an acidic material and the alkaline silicate, resulting in an insoluble colored coating on the mineral particles. Preparation of colored, coated roofing granules is disclosed for example, in U.S. Pat. No. 2,981,636 of Lodge et al. The granules are then employed to provide a protective layer on asphaltic roofing materials such as shingles, and to add aesthetic values to a roof.

Pigments for roofing granules have usually been selected to provide shingles having an attractive appearance, with little thought to the thermal stresses encountered on shingled roofs. However, depending on location and climate, shingled roofs can experience very challenging environmental conditions, which tend to reduce the effective service life of such roofs. One significant environmental stress is the elevated temperature experienced by roofing shingles under sunny, summer conditions. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Asphalt shingles coated with conventional roofing granules are known to have low solar heat reflectance, and hence will absorb solar heat especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can only have solar reflectance of 5-15%. Furthermore, except in the white or very light colors, there is typically only a very small amount of pigment in the conventional granule's color coating that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called heat-island effects and increase the cooling load to its surroundings.

One approach to addressing this problem is suggested in U.S. Patent Application Publication No. 2003/0068469 A1 and U.S. Pat. No. 7,238,408 which disclose an asphalt-based roofing material comprising mat saturated with asphalt coating and a top coating having a top surface layer that has a solar reflectance of at least 70%. Another approach is suggested in U.S. Patent Application Publication 2003/0152747 A1 and U.S. Pat. No. 6,933,007 which disclose the use of novel granules with solar reflectance greater than 55% and hardness greater than 4 in Moh's scale to enhance the solar reflectivity of asphalt based roofing products.

There is a continuing need for roofing materials, and especially asphalt shingles, that have improved resistance to thermal stresses while providing an attractive appearance. In particular, there is a need for roofing granules that provide increased solar heat reflectance to reduce the solar absorption of the shingle.

SUMMARY OF THE INVENTION

The present invention provides roofing granules that provide increased solar heat reflectance, as well as a process for preparing such roofing granules, and asphalt shingle roofing products incorporating such roofing granules.

The present invention provides, in several aspects, solar heat-reflective roofing granules comprising a base particle comprising an inert mineral, with a first coating on the base particle, and a second coating on the first coating, wherein at least one of the first coating and the second coating comprises a solar heat-reflective coating. In another aspect, the present invention provides solar heat-reflective roofing granules comprising a solar heat-reflective base particle, and at least one color coating.

In a first aspect, the present invention provides solar heat-reflective roofing granules comprising a base particle comprising an inert mineral, a first or inner coating on the base particle, and a second or outer coating on the first coating. In this aspect, the second coating is selected from the group consisting of coatings comprising solar heat-reflective nano-pigment particles and coatings comprising multilayer infrared-reflective films. Preferably, the second coating has an average incident radiation transmission coefficient of at least 80 percent in the range 400 nanometers to 800 nanometers. Thus, the second coating is preferably substantially transparent or translucent in the visible range.

In one presently preferred embodiment of this first aspect of the present invention, the first coating on the base particle comprises a metal oxide colorant. Thus, in this aspect, the metal oxide colorant provides color to the first or inner coating, which can be seen through the substantially transparent second or outer coating.

Preferably, in this first aspect of the present invention, the second coating comprises solar heat-reflective nanoparticles that are highly reflective in the near infrared. It is preferred that the second coating comprises titanium dioxide nanoparticles having an average particle or crystal size of less than about 100 nanometers, and more preferably, titanium dioxide nanoparticles having an average particle size of less than about 50 nanometers. In the alternative, in this first aspect of the present invention, it is preferred that the second coating comprise a multilayer infrared-reflective film, at least one layer of the multilayer film being formed from a metal selected from the group consisting of silver, gold and copper. In this alternative, it is preferred that the thickness of the second coating be less than about 50 nanometers.

Preferably, in this first aspect of the solar-reflective roofing granules of the present invention, the granules further comprise a hydrophobic coating on the second or outer coating.

In a second aspect, the present invention provides solar heat-reflective roofing granules including a base particle, which itself comprises an inert mineral, a first or inner coating on the base particle, and a second or outer coating on the first coating. In this aspect the first coating comprises a first coating binder and at least one solar reflecting pigment particulate having an average reflectance of greater than about 60 percent in the wavelength range of from about 700 to 2500 nanometers, and the second coating comprises a second coating binder and at least one solar heat-transparent nano-pigment having an average particle size of less than about 200 nanometers and an absorbency of less than about 20 percent in the wavelength range of from 700 to 2500 nanometers. Preferably, the solar reflecting pigment particles have an average solar reflectivity of at least 80 percent in the wavelength range from 700 to 2500 nanometers. Preferably, the solar reflecting pigment particles are selected from the group consisting of titanium dioxide, zinc dioxide, and zinc sulfide.

Preferably, in this second aspect the second coating binder comprises a metal silicate binder having a refractive index of less than about 1.50. Preferably, the second coating binder comprises a silicate coating binder including at least one low atomic weight element, other than oxygen or hydrogen, having an average atomic weight less than the average atomic weight of silicon. It is preferred that the at least one low atomic weight element be present in sufficient amount in the coating binder to reduce the refractive index by at least about 0.003 units compared with a coating binder without the at least one low atomic weight element but otherwise having the same proportional elemental composition.

Optionally, the second coating can further comprise at least one supplementary pigment having a particle size of greater than about 200 nanometers and an average absorbency of less than about 20 percent in the wavelength range of from 700 to 2500 nanometers. Preferably, the at least one supplementary pigment is selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, phthalo blue, phthalo green, quinacridone red, diarylide yellow, and dioxazine purple.

It is further preferred in this second aspect that the at least one nano-pigment have an average particle size of from about 20 to 150 nanometers. Preferably, the nano-pigment is selected from the group consisting of iron oxides, metal titanates, chromium oxides, zinc ferrites, mixed metal oxides, titanium dioxide, zinc oxides, copper oxides, vanadium oxide, magnesium oxide and the halogen adducts. Optionally, the nano-pigment is selected from the group of pigments that have strong near infrared absorbency in macro-pigment form. In this case, it is preferred that the at least one nano-pigment is selected from the group consisting of carbon black, bone black, copper chromite black, iron oxide black, and $KFe_2(CN)_6 \cdot H_2O$ ("iron blue").

In a third aspect, the present invention provides solar heat-reflective roofing granules comprising a solar-reflective inert base particle, and a color coating over the solar-reflective base particle. The color coating includes a binder and at least one nano-pigment having a particle size of less than about 200 nanometers and an average absorbency of less than about 20 percent in the wavelength range of from 700 to 2500 nanometers. Preferably, the absorbency of the nano-pigment is reduced by at least 50 percent of the absorbency of the corresponding macro-pigment in the same range. Preferably, the solar-reflective inert base particles have an average solar reflectivity of at least 60%. Preferably, the solar-reflective inert base particles are selected from the group consisting of slate, feldspathic rock, plagioclase rock, chert rock, aluminum oxide, mullite, ceramic grog, crushed porcelain, white-pigmented glass, copper, and zinc.

Preferably, the color coating comprises a metal silicate binder having a refractive index of less than about 1.50. It is also preferred that the metal silicate binder comprises a silicate coating binder including at least one low atomic weight element, other than oxygen or hydrogen, having an average atomic weight less than the average atomic weight of silicon. Preferably, the at least one low atomic weight element is present in sufficient amount in the coating binder to reduce the refractive index by at least about 0.003 units compared with a coating binder without the at least one low atomic weight element but otherwise having the same proportional elemental composition.

Preferably, the color coating further comprising at least one supplementary pigment having a particle size of greater than about 200 nanometers and an average absorbency of less than about 20 percent in the wavelength range of from 700 to 2500 nanometers. Preferably, the at least one supplementary pigment is selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, phthalo blue, phthalo green, quinacridone red, diarylide yellow, and dioxazine purple.

Preferably, in this third aspect the at least one nano-pigment has an average particle size of from about 20 to 150 nanometers. It is further preferred that the nano-pigment be selected from the group consisting of iron oxides, metal titanates, chromium oxides, zinc ferrites, mixed metal oxides, titanium dioxide, zinc oxides, copper oxides, vanadium oxide, magnesium oxide and the halogen adducts.

Optionally, the nano-pigment can be selected from the group of pigments that have strong near infrared absorbency in macro-pigment form. Preferably, the at least one nano-pigment is selected from the group consisting of carbon black, bone black, copper chromite black, iron oxide black ("magnetite"), and $KFe_2(CN)_6 \cdot H_2O$ ("iron blue").

In a fourth aspect, the present invention provides solar heat-reflective roofing granules comprising an inert mineral base particle; and a solar heat-reflective, color coating over the base particle, the solar heat-reflective, color coating comprising a binder and at least one nano-pigment having a particle size of less than about 200 nanometers and a reduced absorbency in the wavelength range of from 700 to 2500 nanometers, the absorbency being reduced by at least 50 percent of the absorbency of the corresponding macro-pigment in the same range, and at least one solar heat-reflective pigment. Preferably, the at least one nano-pigment has an average particle size of from about 20 to 150 nanometers. Optionally, the nano-pigment is selected from the group of pigments that have strong near infrared absorbency in macro-pigment form. In this case, it is preferred that the at least one nano-pigment be selected from the group consisting of carbon black, bone black, copper chromite black, iron oxide black, and $KFe_2(CN)_6 \cdot H_2O$ ("iron blue").

The present invention also provides processes for preparing solar heat-reflective roofing granules. In one aspect, the process of the present invention comprises providing base particles comprising an inert mineral, coating the base particles with a first coating composition, curing the first coating composition to form intermediate particles, coating the intermediate particles with a second coating composition, and curing the second coating composition. In one embodiment of the process, the first coating composition includes a colorant, such as conventional metal oxide colorants and/or nano-pigment colorants, and the second coating composition is selected from the group consisting of coating compositions comprising nanoparticles of at least one near infrared-reflective substance, and coating compositions comprising multilayer infrared-reflective films. In another embodiment, the first coating composition comprises nanoparticles of at least one near infrared-reflective substance such as nanoparticle titanium dioxide, and the second coating composition comprises colored nano-pigment that is substantially transparent to the near infrared spectrum.

In addition, the present invention provides a sheet roofing product, such as for example roofing shingles, including a bituminous base and solar heat-reflective roofing granules according to the present invention. In one aspect the solar-reflective roofing granules comprises a base particle comprising an inert mineral, a first coating on the base particle, and a second coating on the first coating. The second coating is selected from the group consisting of coatings comprising nanoparticles of at least one solar heat-reflective substance; and coatings comprising multilayer infrared-reflective films. Preferably, the second layer has an incident radiation transmission coefficient of at least 80 percent in the range 400 nanometers to 800 nanometers. The first coating on the base particle preferably comprises a metal oxide colorant. In one embodiment of the sheet roofing product according to the present invention the second coating comprises titanium dioxide nanoparticles having an average particle or crystal size of less than about 100 nanometers, and more preferably, less than about 50 nanometers. In another embodiment of the sheet roofing product according to the present invention, the second coating comprises a multilayer infrared-reflective film, at least one layer of the multilayer film being formed from a metal selected from the group consisting of silver, gold and copper. In this case, it is preferred that the thickness of the second coating be less than about 50 nanometers.

The present invention also provides a process for producing infrared-reflective roofing shingles, as well as the shingles themselves. This process comprises producing infrared-reflective roofing granules using the process of this invention, and adhering the granules to a shingle stock material.

The colored, infrared-reflective roofing granules prepared according to the process of the present invention can be employed in the manufacture of infrared-reflective roofing products, such as infrared-reflective asphalt shingles and roll goods, including bituminous membrane roll goods. The colored, infrared-reflective granules of the present invention can be mixed with conventional roofing granules, and the granule mixture can be embedded in the surface of bituminous roofing products using conventional methods. Alternatively, the colored, infrared-reflective granules of the present invention can be substituted for conventional roofing granules in manufacture of bituminous roofing products, such as asphalt roofing shingles, to provide those roofing products with solar-reflectance.

The present invention also provides processes for preparing solar heat-reflective roofing granules. In one aspect, the present process includes the steps of (a) providing base particles comprising an inert mineral, (b) coating the base particles with a first or inner coating composition; (c) curing the first coating composition to form intermediate particles; (d) coating the intermediate particles with a second or outer coating composition, and (e) curing the second coating composition. In this process, the second coating composition is selected from the group consisting of (1) coating compositions comprising titanium dioxide nanoparticles; and (2) coating compositions comprising multilayer infrared-reflective films.

The present invention also provides a sheet roofing product, such as an asphalt shingle, including a bituminous base and the solar heat-reflective roofing granules provided by the present invention.

BRIEF DESCRIPTION OF THE DRAWINGS

FIG. 1 is a schematic illustration of the structure of a section of a solar heat-reflective roofing granule according to a first embodiment of the present invention.

FIG. 2 is a schematic illustration of the structure of a section of a solar heat-reflective roofing granule according to a second embodiment of the present invention.

FIG. 3 is a schematic illustration of the structure of a section of a solar heat-reflective roofing granule according to a third embodiment of the present invention.

FIG. 4 is a schematic illustration of the structure of a section of a solar heat-reflective roofing granule according to a fourth embodiment of the present invention.

FIG. 5 is a schematic illustration of the structure of a section of a solar heat-reflective roofing granule according to a fifth embodiment of the present invention.

FIG. 6 is a schematic illustration of the structure of a section of a solar heat-reflective roofing granule according to a sixth embodiment of the present invention.

DETAILED DESCRIPTION OF THE PREFERRED EMBODIMENTS

Infrared-reflective or solar heat-reflective granules of the present invention can be prepared through traditional granule coloring methods, such as those disclosed in U.S. Pat. No. 2,981,636, incorporated herein by reference.

Suitable inert base particles, for example, mineral particles with size passing #8 US mesh and retaining on #70 US mesh, can be coated with a combination the metal-silicate binders, kaolin clay, and reflective pigments, or in combination of other color pigments to reach desirable colors, followed by a heat treatment to obtain a durable coating.

Such a coating process can be repeated to form multiple coatings to further enhance the color and solar heat reflection.

As used in the present specification, "colored" means having an L* value of less than 85, preferably less than 55, even more preferably less than 45, when measured using a HunterLab Model Labscan XE spectrophotometer using a 0 degree viewing angle, a 45 degree illumination angle, a 10 degree standard observer, and a D-65 illuminant. "Colored" as so defined is intended to include relatively dark tones.

As used in the present specification and claims, "infrared-reflective functional pigment" denotes a pigment selected from the group consisting of light-interference platelet pigments including mica, light-interference platelet pigments including titanium dioxide, mirrorized silica pigments based upon metal-doped silica, and alumina. As used in the present specification and claims, "granule coloring pigment" denotes a conventional metal oxide-type pigment employed to color roofing granules. UV-stabilized dyes are dye compositions formulated with uv-stabilization materials. As used in the present specification and claims, the near infrared range ("NIR") of solar spectrum means the spectral range from about 700 nm to about 2500 nm.

As used in the present specification and claims, the strength in color space E* is defined as $E^*=(L^{*2}+a^{*2}+b^{*2})^{1/2}$, where L*, a*, and b* are the color measurements for a given sample using the 1976 CIE L*a*b* color space. The total color difference ΔE* is defined as $\Delta E^*=(\Delta L^{*2}+\Delta a^{*2}+\Delta b^{*2})^{1/2}$ where ΔL*, Δa*, and Δb* are respectively the differences in L*, a* and b* for two different color measurements.

As used in the present specification and claims, "nanoparticle" means a particle having an average particle size of less than about 200 nanometers. As used in the present specification and claims, "nano-pigment" means a pigment particle having an average particles size less than about 200 nanometers.

The inert base particles or cores employed in the process of the present invention are preferably chemically inert materials, such as inert mineral particles. The mineral particles, which can be produced by a series of quarrying, crushing, and screening operations, are generally intermediate between sand and gravel in size (that is, between about #8 U.S. mesh and #70 U.S. mesh), and more preferably with sizes ranging from #8 U.S. mesh to #40 U.S. mesh. Preferably, the mineral particles have an average particle size of from about 0.2 mm to about 3 mm, and more preferably from about 0.4 mm to about 2.4 mm.

In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled or manufactured materials such as propant bodies, crushed bricks, concrete, porcelain, fire clay, and the like. Other types of cores can also be used, provided that they have similar size range, adequate crush strength to endure the manufacturing process of shingle making, and having suitable durability for roofing environments.

In one set of presently preferred embodiments, the inert base particles comprise solar-reflective particles. Preferably, in this embodiment, the inert base particles are selected from the group consisting of slate, feldspathic rock, plagioclase rock, chert rock, aluminum oxide, mullite, ceramic grog, crushed porcelain, white-pigmented glass, copper, and zinc.

In one set of presently preferred embodiments, the inert base particles comprise particles having a generally plate-like geometry. Examples of generally plate-like particles include mica and flaky slate. Colored roofing granules having a generally plate-like geometry have been found to provide greater surface coverage when used to prepare bituminous roofing products, when compared with conventional "cubical" roofing granules, as shown in Table 1 below. Granule surface coverage is measured using image analysis software, namely, Image-Pro Plus from Media Cybernetics, Inc., Silver Spring, Md. 20910. The shingle surface area is recorded in a black and white image using a CCD camera fitted to a microscope. The image is then separated into an asphalt coating portion and a granule covering portion using the threshold method in gray scale. The amount of granule coverage is then calculated by the image analysis software based upon the number of pixels with gray scale above the threshold level divided by the total number of pixels in the image.

TABLE 1

| Sample | Color | Granule Type | Surface Coverage % |
|---|---|---|---|
| A | White | cubical | 86.0 |
| B | Wood Blend | cubical | 86.6 |
| C | Natural | flaky slate | 91.6 |
| D | Natural | flaky slate | 92.1 |
| E | Natural | flaky slate | 92.9 |
| F | Natural | flaky slate | 91.8 |

Roofing granules of the present invention include one or more coating layers formed from suitable coating compositions. The coating compositions typically include a coating binder in which particulate material is dispersed to provide a desired specific function, such as to provide an aesthetically attractive color, or to provide solar heat reflectance.

Suitable binders for the coating compositions employed in preparing roofing granules according to the present invention can include, but not limited to, metal-silicates, phosphates, aluminates, silica coating, ceramic glazes, and suitable polymeric binders with good outdoor durability. When metal-silicate binders are used, the said roofing granules can be manufactured by the traditional method for making rooting granules as those disclosed in U.S. Pat. No. 2,927,045. The coating binders employed in the coating compositions of the present invention preferably comprise an aluminosilicate material, such as kaolin clay and an alkali metal silicate, such as sodium silicate. Alternatively, the binder, and especially binders employed in preparing coating compositions for outer or exterior coating layers, can comprise an organic material, such as a curable polymeric material.

Coating binders employed in the processes of the present invention to form coating compositions are preferably formed from a mixture of an alkali metal silicate, such as aqueous sodium silicate, and heat-reactive aluminosilicate material, such as clay, preferably, kaolin. The proportion of alkali metal silicate to heat-reactive aluminosilicate material is preferably from about 3:1 to about 1:3 parts by weight alkali metal silicate to parts by weight heat-reactive aluminosilicate material, more preferably about 2:1 to about 0.8:1 parts by weight alkali metal silicate to parts by weight heat-reactive aluminosilicate material. Alternatively, the inert base or core particles can be first mixed with the heat-reactive aluminosilicate to coat the base particles, and the alkali metal silicate can be subsequently added with mixing. When two or more coating layers are formed on the inert base or core particles, the inner and outer coating layers can be formed from coating compositions formulated using the same or similar binders.

When the roofing granules are fired at an elevated temperature, such as at least about 200 degrees C., and preferably about 250 to 500 degrees C., the clay reacts with and neutralizes the alkali metal silicate, thereby insolubilizing the binder. The binder resulting from this clay-silicate process, believed to be a sodium aluminum silicate, is porous, such as disclosed in U.S. Pat. No. 2,379,358 (incorporated herein by reference). Alternatively, the porosity of the insolubilized binder can be decreased by including an oxygen containing boron compound such as borax in the binder mixture, and firing the granules at a lower temperature, for example, about 250 degree C. to 400 degrees C., such as disclosed in U.S. Pat. No. 3,255,031 (incorporated herein by reference).

Examples of clays that can be employed in the process of the present invention include kaolin, other aluminosilicate clays, Dover clay, bentonite clay, etc.

Coating binders employed in the present invention can include an alkali metal silicate such as an aqueous sodium silicate solution, for example, an aqueous sodium silicate solution having a total solids content of from about 38 percent by weight to about 42 percent by weight, and having a ratio of sodium oxide to silicon dioxide of from about 1:2 to about 1:3.25.

In one aspect of the present invention, it is preferred to select the composition of the coating binder to maximize the difference in refractive index between the coating binder material and the particulate material dispersed in the coating binder. For example, the present invention provides roofing granules with a pigmented ceramic coating layer having enhanced light scattering efficiency. A particularly useful embodiment provided by the present invention comprises reflective roofing granules with enhanced solar reflectance, where the granules have a ceramic coating comprising a metal-silicate binder and solar heat-reflecting nanoparticles, and the metal-silicate binder includes at least one element having an atomic weight less than the atomic weight of silicon. These lower atomic weight elements serve to decrease the measured refractive index of the cured metal-silicate binder. Preferably, the lower atomic weight element or elements are provided in sufficient amount to lower the measured refractive index of the cured metal-silicate binder by at least 0.003 units, more preferably by at least 0.005 units.

The decrease in the refractive index of the cured metal-silicate binder results in a greater differential in refractive index between the matrix and the particulate material, such as nanoparticles, in the coating layer. This greater refractive index difference increases the light scattering efficiency of the particulate in the coating layer, thus increasing the reflectivity of the coating layer. The increased reflectivity can be in any or all of the visible, near infrared and infrared spectral ranges. Since the refractive index of a material is a physical property dependent on the frequency of electromagnetic radiation, the composition of the specific layer can be selected to enhance the refractive index difference between the coating binder and the particulate material dispersed in the coating binder for a specific frequency range. For example, in the case of a coating layer in which solar heat-reflecting nanoparticles are dispersed, the composition of the coating binder can be selected to increase the refractive index difference in the near infrared spectral range. Similarly, in the case of a coating layer in which colored nano-pigment particles are dispersed, the composition of the coating binder can be selected to increase the refractive index difference between the coating binder and the particulate material dispersed in the coating binder in the visible spectral range. Thus, roofing granules of the present invention having colored coating layers can exhibit more vivid colors than roofing granules having coatings based on conventional silicate binders. Similarly, roofing granules of the present invention having solar heat-reflective coating layers can exhibit greater solar reflectance than roofing granules having coating layers based on conventional silicate binders.

Organic binders can also be employed in the preparing roofing granules of the present invention. The use of suitable organic binders, when cured, can also provide superior granule surface with enhanced granule adhesion to the asphalt substrate and with better staining resistance to asphaltic materials. Roofing granules colored by inorganic binders often require additional surface treatments to impart certain water repellency for granule adhesion and staining resistance. U.S. Pat. No. 5,240,760 discloses examples of polysiloxane-treated roofing granules that provide enhanced water repellency and staining resistance. With the organic binders, the additional surface treatments may be eliminated. Also, certain organic binders, particularly those water-based systems, can be cured by drying at much lower temperatures as compared to the inorganic binders such as metal-silicates, which often require curing at temperatures greater than about 500° C. or by using a separate pickling process to render the coating durable.

Examples of organic binders that can be employed in the process of the present invention include acrylic polymers, alkyd and polyesters, amino resins, epoxy resins, phenolics, polyamides, polyurethanes, silicone resins, vinyl resins, polyols, cycloaliphatic epoxides, polysulfides, phenoxy, fluoropolymer resins. Examples of uv-curable (that is, curable by exposure to ultraviolet radiation) organic binders that can be employed in the process of the present invention include uv-curable acrylates and uv-curable cycloaliphatic epoxides.

An organic material can be employed as a binder for the coating composition used in the process of the present invention. Preferably, a hard, transparent organic material is employed. Especially preferred are uv-resistant polymeric materials, such as poly(meth)acrylate materials, including poly methyl methacrylate, copolymers of methyl methacrylate and alkyl acrylates such as ethyl acrylate and butyl acrylate, and copolymers of acrylate and methacrylate monomers with other monomers, such as styrene. Preferably, the monomer composition of the copolymer is selected to provide a hard, durable coating. If desired, the monomer mixture can include functional monomers to provide desirable properties, such as crosslinkability to the copolymers. The organic material can be dispersed or dissolved in a suitable solvent, such as coatings solvents well known in the coatings arts, and the resulting solution used to coat the granules using conventional coatings techniques. Alternatively, water-borne emulsified organic materials, such as acrylate emulsion polymers, can be employed to coat the granules, and the water subsequently removed to allow the emulsified organic materials of the coating composition to coalesce.

Roofing granules according to the present invention can include a colored coating layer in which particles of one or more conventional metal oxide pigments are dispersed. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Further examples of coatings pigments that can be used include white titanium dioxide pigments provided by Du Pont de Nemours, P.O. Box 8070, Wilmington, Del. 19880.

Examples of white pigments that can be employed in preparing coating layers of the roofing granules of the present invention include rutile titanium dioxide, anatase titanium dioxide, lithopone, zinc sulfide, zinc oxide, lead oxide, and void pigments such as spherical styrene/acrylic beads (Ropaque® beads, Rohm and Haas Company), and hollow glass beads having pigmentary size for increased light scattering.

Roofing granules according to the present invention can include one or more coating layers in which are dispersed near infrared-reflective pigments. Examples of colored infrared-reflective pigments that can be used include infrared-reflective pigments that comprise a solid solution including iron oxide, such as disclosed in U.S. Pat. No. 6,174,360, incorporated herein by reference. Colored infrared-reflective pigments the can be used in the preparing the roofing granules of the present invention also include near infrared-reflecting composite pigments such as disclosed in U.S. Pat. No. 6,521,038, incorporated herein by reference. Composite pigments are composed of a near-infrared non-absorbing colorant of a chromatic or black color and a white pigment coated with the near infrared-absorbing colorant. Near-infrared non-absorbing colorants that can be used in the present invention are organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups.

Other examples of near infrared-reflective pigments include those available from the Shepherd Color Company, Cincinnati, Ohio, including Arctic Black 10C909 (chromium green-black), Black 411 (chromium iron oxide), Brown 12 (zinc iron chromite), Brown 8 (iron titanium brown spinel), and Yellow 193 (chrome antimony titanium).

Near infrared-reflective coating compositions according to the present invention can also include supplementary pigments to space infrared-reflecting pigments, to reduce absorption by multiple-reflection. Examples of such "spacing" pigments include amorphous silicic acid having a high surface area and produced by flame hydrolysis or precipitation, such as Aerosil TT600 supplied by Degussa, as disclosed in U.S. Pat. No. 5,962,143, incorporated herein by reference.

Roofing granules according to the present invention can include one or more coating layers in which nano pigment particles are dispersed to provide color while reducing absorption in the visible spectral range in comparison with pigment particles of the same chemical composition but having a greater average particle size. Colored nano-pigments that can be employed in the coating layers of the roofing granules of the present invention include colored nano-pigments having an average particle size of less than about 200 nanometers and an average absorbency of less than about 20 percent in the wavelength range of from 700 to 2500 nanometers. Examples of colored nano-pigments that can be employed in the roofing granules of the present invention include carbon black, bone black, copper chromite black, iron oxide black, and $KFe_2(CN)_6 \cdot H_2O$.

Roofing granules according to the present invention can also include one or more coating layers in which solar heat-reflective nanoparticles are dispersed to provide solar heat reflectivity.

Solar heat-reflective roofing granules employing an outer coating layer including nanoparticles are preferably provided by coating intermediate particles with sol-gel coating composition of nanoparticles, preferably titanium dioxide nanoparticles, and curing the resulting coated intermediate particles. The sol-gel coating composition preferably comprises titanium dioxide nanoparticles dispersed in tetraethyl orthosilicate, a silicic acid ester coupling agent. Examples of coupling agents that can be employed in preparing the titanium dioxide nanoparticle sol include silicic acid esters such as tetrabutyl orthosilicate, tetramethoxysilane, tetra-n-propoxysilane, and oligomeric tetraethoxysilane (available under the SIVENTO trademark from Degussa AG, Frankfurt am Main, Germany), alkylalkoxysilanes such as methyltrimethoxysilane, methyltriethoxysilane, propyltrimethoxysilane, propyltriethoxysilane, isobutyltrimethoxysilane, isobutyltriethoxysilane, octyltrimethoxysilane, octyltriethoxysilane, hexadecyltrimethoxysilane, phenyl trimethoxysilane, and phenyltriethoxysilane, haloalkylalkoxysilanes such as tridecafluoro-1,1,2,2-tetrahydrooctyltriethoxysilane, organofunctional silanes such as 3-glycidyloxypropyltrimethoxysilane, 3-glycidyloxypropyltriethoxysilane, 3-methyacryloxypropyltrimethoxysilane, vinyltrimethoxysilane, vinyltriethoxysilane, 3-mercaptopropyltrimethoxysilane, and 3-mercaptopropyltriethoxysilane, aminofunctional alkoxysilanes such as 3-aminopropyltriethoxysilane, 3-aminopropyltrimethoxysilane, 2-aminoethyl-3-aminopropyltrimethoxysilane, triaminofunctional propyltrimethoxysilane, N-(n-butyl)-3-aminopropyltrimethoxysilane, and 3-aminopropylmethydiethoxysilane, and mixtures thereof. The silane coupling agent is typically dissolved in an alcohol such as ethanol, isopropanol, methoxypropanol, or an alcoholic mixture, and then hydrolyzed by addition of water acidified with hydrochloric acid or sulfuric acid, to form a sol-gel coating composition. The titanium dioxide nanoparticles can be dispersed in the silane/alcohol solution prior to the addition of the acidified water. The coating composition can be applied to the intermediate particles by conventional coating application techniques such as by spraying, dipping, flow coating, and the coating can be subsequently cured thermally. If desired, suitable crosslinking agents can be included in the coating composition to effect a room temperature cure, such as by hydrolysis by ambient moisture.

The nanoparticle titanium dioxide can be prepared by hydrolysis from hydrolyzable titanium compounds, such as for example, titanium trichloride, titanium tetrachloride, titanyl sulfate, titanium sulfate, titanium oxysulfate, titanium iron sulfate solution, titanium oxychloride, as well as titanium alkoxides including titanium ethoxide, titanium ethylhexoxide, titanium isobutoxide, titanium isopropoxide, titanium isopropylate or titanium methoxide. For example, a nanoparticle titanium dioxide sol can be produced by adding titanium isopropoxide dropwise to concentrated hydrochloric acid diluted with a suitable polar organic solvent such as 2-methoxyethanol. The production of titanium dioxide nanoparticles is disclosed, for example, in U.S. Pat. Nos. 5,840,111, 6,610,135, and 6,653,356.

Titanium dioxide nanoparticles can also be prepared by condensation techniques, such as a combustion flame—chemical vapor condensation process from an organometallic precursor compound, such as disclosed, for example, in U.S. Pat. Nos. 5,514,350 and 5,876,683.

Sol-gel coating systems are well known in the coatings art, and are discussed, for example, in C. J. Brinker and G. W. Scherer, *Sol-Gel Science: The Physics and Chemistry of Sol-Gel Processing* (Academic Press San Diego 1989).

In the alternative, the solar heat-reflective roofing granule employing titanium dioxide nanoparticles are provided by coating intermediate particle with an outer coating composition comprising titanium dioxide nanoparticles dispersed in an alkali metal silicate binder, and then curing the alkali metal silicate binder by the application of heat or by chemical means, depending on the binder composition.

Optionally, the coating compositions of the present invention further comprise at least one supplementary pigment. Preferably, supplementary pigments having high near infrared transparency are used in preparing coating layers employed in the roofing granules of the present invention. Examples of supplementary pigments include pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, and organic pigments such as phthalo blue, phthalo green, quinacridone red, diarylide yellow, and dioxazine purple.

Preferred supplementary pigments include pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, phthalo blue, phthalo green, quinacridone red, diarylide yellow, and dioxazine purple.

Light-interference platelet pigments are known to give rise to various optical effects when incorporated in coatings, including opalescence or "pearlescence." Surprisingly, light-interference platelet pigments have been found to provide or enhance infrared-reflectance of roofing granules coated with compositions including such pigments.

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/ green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon Al2O3 platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on SiO2 platelets coated with metal oxides, including ColorStream F 20-00 WNT autumn mystery and ColorStream F 20-07 WNT viola fantasy; and ultra interference pigments based on $TiO_2$ and mica.

Examples of mirrorized silica pigments that can be employed in the process of the present invention include pigments such as Chrom Brite™ CB4500, available from Bead Brite, 400 Oser Ave, Suite 600, Hauppauge, N.Y. 11788.

Aluminum oxide, preferably in powdered form, can be used as solar-reflective additive in the color coating formulation to improve the solar reflectance of colored roofing granules without affecting the color. The aluminum oxide should have particle size less than #40 US mesh (425 micrometer), preferably between 0.1 micrometer and 5 micrometer. More preferably, the particle size is between 0.3 micrometer and 2 micrometer. The alumina should have percentage $Al_2O_3$>90%, more preferably >95%.

In another aspect of the present invention, the colored solar heat-reflective roofing granules are formed from intermediate particles, such as conventional colored roofing granules, comprising inert mineral base particles coated with a cured first coating composition including a first or inner coating binder and at least one metal oxide colorant. The intermediate particles are coated with a cured transparent second or outer coating including at least two thin metal layers. Preferably, the thickness of the second coating formed by the at least two metal layers is selected to maximize infrared reflectivity consistent with achieving the desired color tone for the roofing granule. Preferably at least one layer of the second coating is formed from a metal selected from the group consisting of silver, gold and copper.

The deposition of thin metal films by a variety of techniques is well known in the art. Preferably, each of the layers of thin film is applied by an application process selected from the group consisting of atmospheric plasma deposition, plasma-assisted polymerization, chemical vapor deposition, physical vapor deposition, sputtering, casting, coating, laminating, electroplating, electroless plating, and thermal spraying. Preferably, the application process is selected from the group consisting of atmospheric plasma deposition, plasma-assisted polymerization, and physical vapor deposition.

Preferably, each of the layers of the thin film comprises a material selected from the group consisting of silver, aluminum, copper, zinc, tin, gold, palladium, nickel, and alloys thereof. Each of the layers of thin film can comprise an alloy of silver and copper, an alloy of gold and palladium, etc.

In one aspect of the process of the present invention, a clear coating is applied over the outermost layer of thin film to protect the thin film. Preferably, the clear coating is applied by a method selected from the group consisting of spraying, electrostatic spraying, sonic spraying, ink jet printing, gravure printing, roll coating, and extrusion coating. Preferably, the clear coating is selected from the group consisting of poly(meth)acrylates, polyurethanes, fluoropolymers, phosphates, titanates, zirconates, silicates, and silicas.

Preferably, the outer surface of the intermediate particles is prepared for application of the first layer of thin film; preferably, by cleaning. Preferably, the intermediate particles are cleaned by a process selected from the group consisting of atmospheric pressure plasma cleaning, corona treating, solvent washing, detergent washing, soap washing, high pressure washing, and steam cleaning.

Referring now to the figures in which like reference numerals represent like element in each of the several views, there is shown in FIG. 1, a schematic illustration of the structure of a section of a colored infrared-reflective roofing granule 100 according to a presently preferred first embodiment of the present invention.

FIG. 1 is a schematic illustration of the structure of a colored infrared-reflective roofing granule 100 according to a presently preferred first embodiment of the present invention. In this embodiment, the colored solar heat-reflective roofing granules 100 are prepared from intermediate particles 120 comprising inert mineral base particles 102 coated with a cured first coating composition 104 including a first or inner coating binder 106 and at least one metal oxide colorant 108 to form an inner or first coating layer 110.

The intermediate particles 120 are coated with a cured transparent second or outer coating composition 130 including a second or outer coating binder 134, and highly reflective nanoparticles 132, such as titanium dioxide nanoparticles to form a second or outer coating layer 140. Preferably, the cured second coating composition 130 is transparent to visible radiation, so that the appearance of the colored infrared-reflective roofing granules 100 is determined by the metal oxide colorant(s) 108 in the cured first coating composition 104. Preferably, the thickness of the outer coating layer 140 formed by the cured second coating composition 130, the outer coating binder 134, and the nanoparticles 132 are selected to maximize transparency consistent with achieving the desired color tone for the roofing granule 100. The outer coating layer 140 is preferably formed by a sol-gel of titanium dioxide nanoparticles; however, other types of sufficiently small highly reflective pigment particles, such as zinc oxide particles, dispersed in other types of coating binders, such as conventional metal silicate binders, can also be employed. In particular, titanium dioxide nanoparticles dispersed in a conventional metal silicate binder can also be used.

Preferably, the hydrophobicity of the outer coating layer 140 is increased by the addition of a mineral oil or silicone oil coating 142, in order to enhance the adhesion of the roofing granules 100 to bituminous surfaces and to increase the ease of manufacture.

Preferably, in the colored solar heat-reflective roofing granules 100 the nanoparticles 132 comprise from about 0.5 percent by weight to about 40 percent by weight of the second coating composition 130. Preferably, the nanoparticles 132 have an average particle size or crystal size of less than about 100 nanometers, and more preferably, of less than about 50 nanometers. It is also preferred that the nanoparticles be substantially free of any material of a size large enough to effectively scatter incident light, and thus to contribute opacity to the outer coating layer 140.

Preferably, the second layer comprising the cured second coating composition 140 has an incident radiation transmission coefficient of at least 60 percent, and more preferably at least 90 percent, in the range 400 nanometers to 800 nanometers.

In this first embodiment, the second coating composition 130 comprises from about 2 percent by weight of the intermediate particles 120 to about 20 percent by weight of the intermediate particles 120, more preferably, from about 4 percent by weight of the intermediate particles 120 to about 10 percent by weight of the intermediate particles 120. In this first embodiment, the first or base coating composition 104 preferably comprises from about 1 percent by weight of the inert mineral particles 102 to about 20 percent by weight of the inert mineral particles 102. In this first embodiment, the inner or first coating composition binder 106 preferably comprises an aluminosilicate material and an alkali metal silicate, and the aluminosilicate material is preferably clay, although an organic material can optionally be employed as the first coating composition binder 106.

Thus, in this first embodiment of colored solar heat-reflective roofing granules 100 according to the present invention, the infrared or solar heat reflectance of the colored roofing granules 100 is attributable to titanium dioxide nanoparticles 132 in the cured outer or second coating composition 130, while the color of the granules 100 is substantially attributable to the at least one metal oxide colorant 108 in the cured inner or first coating composition 104.

FIG. 2 is a schematic illustration of the structure of a colored solar heat-reflective roofing granule 160 according to a presently preferred second embodiment of the present invention. In this embodiment, the colored solar heat-reflective roofing granules 160 comprise intermediate particles 180 which include inert mineral base particles 162 coated with a cured first coating composition 164 including a first or inner coating binder 166 and at least one metal oxide colorant 168, to form a first or inner coater layer 170 and the intermediate particles 180 are coated with a cured transparent second or outer coating 190 including at least two metal layers, such as the three metal layers 192, 194, 196, exemplified in FIG. 2. Preferably, the thickness of the second coating 190 formed by the at least two metal layers 192, 194, 196 is selected to maximize infrared reflectivity while simultaneously achieving the desired color tone for the roofing granule 160. Preferably at least one layer of the second coating 190 is formed from a metal selected from the group consisting of silver, gold and copper.

Preferably, the hydrophobicity of the second coating layer 190 is increased by the addition of a mineral oil or silicone oil 198 coating, in order to enhance the adhesion of the roofing granules 160 to bituminous surfaces and to increase the ease of manufacture.

Preferably, in the colored solar heat-reflective roofing granules 160 the thickness of the second coating layer 190 is less than about 50 nanometers.

Preferably, the second coating layer 190 has an incident radiation transmission coefficient of at least 60 percent, and more preferably at least 90 percent, in the range 400 nanometers to 800 nanometers.

In this second embodiment, the second coating layer 190 comprises from about 2 percent by weight of the intermediate particles 180 to about 20 percent by weight of the intermediate particles 180, more preferably, from about 4 percent by weight of the intermediate particles 180 to about 10 percent by weight of the intermediate particles 180. In this second embodiment, the first or base coating composition 164 preferably comprises from about 1 percent by weight of the inert mineral particles 162 to about 20 percent by weight of the inert mineral particles 162. In this second embodiment, the inner or first coating composition binder 166 preferably comprises an aluminosilicate material and an alkali metal silicate, and the aluminosilicate material is preferably clay, although an organic material can optionally be employed as the first coating composition binder 166.

Thus, in this second embodiment of colored solar heat-reflective roofing granules 160 according to the present invention, the infrared or solar heat reflectance of the colored roofing granules 160 is attributable to the reflectivity of the thin metal films 192, 194, 196, while the color of the granules 160 is substantially attributable to the at least one metal oxide colorant 168 in the cured inner or first coating composition 164.

FIG. 3 is a schematic illustration of the structure of a colored infrared-reflective roofing granule 200 according to a presently preferred third embodiment of the present invention. In this embodiment, the colored solar heat-reflective roofing granules 200 are prepared from intermediate particles 220 comprising inert mineral base particles 202 coated with a cured first coating composition 204 including a first or inner coating binder 206 and highly reflective nanoparticles 208, such as titanium dioxide nanoparticles, to form a first or inner coating layer 210. The inner coating layer 210 is preferably formed by a sol-gel of titanium dioxide nanoparticles; however, other types of sufficiently small highly reflective pigment particles, such as zinc oxide particles, dispersed in other types of coating binders, such as conventional metal silicate binders, can also be employed. In particular, titanium dioxide nanoparticles dispersed in a conventional metal silicate binder can also be used. Preferably, the highly reflective pigment particles have an average reflectance greater than about 60 percent in the wavelength range of from about 700 to 2500 nanometers, and more preferably greater than about 80 percent.

The intermediate particles 220 are coated with a cured second or outer coating composition 230 including a second or outer coating binder 234 and colored nano-pigment particles 232, such as iron oxide nanoparticles, to form an outer or second coating layer 240. The cured second coating composition 230 can be substantially transparent to radiation in the wavelength range from about 700 to 2500 nanometers, so that solar heat radiation incident upon the outer coating layer 240 is transmitted through the outer coating layer 240 to the inner coating layer 210 and reflected by the highly reflective nanoparticles 208 in the inner coating layer 210 back through the outer coating layer 240. The appearance of the colored infrared-reflective roofing granules 200 is determined by the nano-pigment colorant(s) 232 in the cured second coating composition 230 forming the outer coating layer 240. Preferably, the thickness of the outer coating layer 240 formed by the cured second coating composition 230, the outer coating binder 234, and the nano-pigment particles 232 are selected to achieve the desired color tone for the roofing granule 200.

Preferably, the second or outer layer 240 comprising the cured second coating composition 230 has an incident radiation transmission coefficient of at least 60 percent, and more preferably at least 90 percent, in the range 800 nanometers to 2500 nanometers.

In this third embodiment, the second coating composition 230 comprises from about 2 percent by weight of the intermediate particles 220 to about 20 percent by weight of the intermediate particles 220, more preferably, from about 4 percent by weight of the intermediate particles 220 to about 10 percent by weight of the intermediate particles 220. In this third embodiment, the first or base coating composition 204 preferably comprises from about 1 percent by weight of the inert mineral particles 202 to about 20 percent by weight of the inert mineral particles 202. In this third embodiment, the inner or first coating composition binder 206 preferably comprises an aluminosilicate material and an alkali metal silicate, and the aluminosilicate material is preferably clay, although an organic material can optionally be employed as the first coating composition binder 206.

Thus, in this third embodiment of colored solar heat-reflective roofing granules 200 according to the present invention, the infrared or solar heat reflectance of the colored roofing granules 200 is attributable to the titanium dioxide nanoparticles 208 in the cured inner or first coating composition 204 forming the inner coating layer 210, while the color of the granules 200 is substantially attributable to the at least one nano-pigment colorant 232 in the cured outer or second coating composition 230 forming the outer coating layer 240.

FIG. 4 is a schematic illustration of the structure of a colored infrared-reflective roofing granule 260 according to a presently preferred fourth embodiment of the present invention. In this embodiment, the colored solar heat-reflective roofing granules 260 are prepared from inert mineral base particles 262 formed from a solar heat-reflective material, such as slate, feldspathic rock, plagioclase rock, chert rock, aluminum oxide, mullite, ceramic grog, crushed porcelain, white-pigmented glass, copper, and zinc. Preferably, the solar-reflective inert base particles have a solar reflectivity of at least 60 percent. Preferably, the solar heat-reflective base particles have an average reflectance greater than about 60 percent in the wavelength range of from about 700 to 2500 nanometers, and more preferably greater than about 80 percent.

The solar heat-reflective base particles 262 are coated with a cured outer coating composition 270 including an outer coating binder 274 and colored nano-pigment particles 272, such as iron oxide nanoparticles, to form an outer coating layer 280. The cured coating composition 270 can be substantially transparent to radiation in the wavelength range from about 700 to 2500 nanometers, so that solar heat radiation incident upon the outer coating layer 280 is transmitted through the outer coating layer 280 to the surface 264 of the solar heat-reflective base particles 262 and reflected by the solar heat-reflective base particles 262 back through the outer coating layer 280. The appearance of the colored infrared-reflective roofing granules 260 is determined by the nano-pigment colorant(s) 272 in the cured outer coating composition 270 forming the outer coating layer 280. Preferably, the thickness of the outer coating layer 280 formed by the cured outer coating composition 270, the outer coating binder 274, and the nano-pigment particles 272 is selected to achieve the desired color tone for the roofing granule 260.

Thus, in this fourth embodiment of colored solar heat-reflective roofing granules 260 according to the present invention, the infrared or solar heat reflectance of the colored roofing granules 260 is substantially attributable to the solar heat-reflective base particles 262, while the color of the granules 260 is substantially attributable to the at least one nano-pigment colorant 272 in the cured outer or second coating composition 270 forming the outer coating layer 280.

FIG. 5 is a schematic illustration of the structure of a colored infrared-reflective roofing granule 300 according to a presently preferred fifth embodiment of the present invention. In this embodiment, the colored solar heat-reflective roofing granules 300 are prepared from inert mineral base particles 302 formed from a non-solar heat-reflective material.

The inert base particles 302 are coated with a cured coating composition 310 including a coating binder 304, and pigments 314 including colored nano-pigment particles 312, such as iron oxide nanoparticles, and solar heat-reflective nanoparticles 318, such as nanoparticle titanium dioxide, to form an outer coating layer 320. The cured coating composition 310 can be substantially reflective to radiation in the wavelength range from about 700 to 2500 nanometers, so that solar heat radiation incident upon the outer coating layer 320 is reflected by the solar heat-reflective nanoparticles 318. The appearance of the colored infrared-reflective roofing granules 300 is determined by the nano-pigment colorant(s) 312 in the cured coating composition 310 forming the outer coating layer 320. Preferably, the thickness of the outer coating layer 320 formed by the cured coating composition 310, the outer coating binder 314, and the nano-pigment particles 318 is selected to achieve the desired color tone for the roofing granule 300.

Thus, in this fifth embodiment of colored solar heat-reflective roofing granules 300 according to the present invention, the infrared or solar heat reflectance of the colored roofing granules 300 is substantially attributable to the solar heat-reflective nanoparticles 318, while the color of the granules 300 is substantially attributable to the at least one nano-pigment colorant 312 in the cured outer coating composition 310 forming the outer coating layer 320.

FIG. 6 is a schematic illustration of the structure of a colored infrared-reflective roofing granule 340 according to a presently preferred sixth embodiment of the present invention. In this embodiment, the colored solar heat-reflective roofing granules 340 are prepared from intermediate particles 360 comprising inert mineral base particles 342 coated with a cured first coating composition 344 including a first or inner coating binder 346 and highly reflective nanoparticles 348, such as titanium dioxide nanoparticles, to form a first or inner coating layer 350. The inner coating layer 350 is preferably formed by a sol-gel of titanium dioxide nanoparticles; however, other types of sufficiently small highly reflective pigment particles, such as zinc oxide particles, dispersed in other types of coating binders, such as conventional metal silicate binders, can also be employed. In particular, titanium dioxide nanoparticles dispersed in a conventional metal silicate binder can also be used. Preferably, the highly reflective pigment particles have an average reflectance greater than about 60 percent in the wavelength range of from about 700 to 2500 nanometers, and more preferably greater than about 80 percent.

The intermediate particles 360 are coated with a cured second or outer coating composition 370 including a second or outer coating binder 374 and colored nano-pigment particles 372, such as iron oxide nanoparticles, and at least one supplementary pigment 376 to form an outer or second coating layer 380. The at least one supplementary pigment can be selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, phthalo blue, phthalo green, quinacridone red, diarylide yellow, and dioxazine purple. The cured second coating composition 370 can be substantially transparent to radiation in the wavelength range from about 700 to 2500 nanometers, so that solar heat radiation incident upon the outer coating layer 380 is transmitted through the outer coating layer 380 to the inner coating layer 350 and reflected by the highly reflective nanoparticles 348 in the inner coating layer 350 back through the outer coating layer 380. The appearance of the colored infrared-reflective roofing granules 340 is determined by the nano-pigment colorant(s) 372 and the supplementary pigment(s) 376 in the cured second coating composition 370 forming the outer coating layer 380. Preferably, the thickness of the outer coating layer 380 formed by the cured second coating composition 370, the outer coating binder 374, the nano-pigment particles 372, and the supplementary pigment particles 378, is selected to achieve the desired color tone for the roofing granule 360.

Preferably, the second or outer layer 380 comprising the cured second coating composition 370 has an incident radiation transmission coefficient of at least 60 percent, and more preferably at least 90 percent, in the range 800 nanometers to 2500 nanometers.

In this sixth embodiment, the second coating composition 370 comprises from about 2 percent by weight of the intermediate particles 360 to about 20 percent by weight of the intermediate particles 360, more preferably, from about 4 percent by weight of the intermediate particles 360 to about 10 percent by weight of the intermediate particles 360. In this sixth embodiment, the first or base coating composition 344 preferably comprises from about 1 percent by weight of the inert mineral particles 342 to about 20 percent by weight of the inert mineral particles 342. In this sixth embodiment, the inner or first coating composition binder 346 preferably comprises an aluminosilicate material and an alkali metal silicate, and the aluminosilicate material is preferably clay, although an organic material can optionally be employed as the first coating composition binder 346.

Thus, in this sixth embodiment of colored solar heat-reflective roofing granules 340 according to the present invention, the infrared or solar heat reflectance of the colored roofing granules 340 is attributable to the titanium dioxide nanoparticles 348 in the cured inner or first coating composition 344 forming the inner coating layer 350, while the color of the granules 340 is substantially attributable to the at least one nano-pigment colorant 372 and the at least one supplementary pigment 376 in the cured outer or second coating composition 374 forming the outer coating layer 380.

Thus, in one aspect of the present invention, roofing granules with high solar reflectance are prepared dispersing nano-sized color pigments in a binder to form an outer coating composition. The outer coating composition is applied over a reflective core particle, or optionally over a core particle that has been coated using a solar reflective base or inner coating composition. Nano-sized color pigments are known to have limited transparency in the color visible spectrum from 360 nm-700 nm, and this transparency can be employed to provide desirable color effects, as in the case of staining wood substrates to reveal the wood grains. However, nano-sized color pigments also exhibit transparency in the near infrared range ("NIR") of solar spectrum ranging from 700 nm-2500 nm. Thus, in roofing granules prepared in accordance with this aspect of the present invention, a portion of the solar radiation in the NIR range is reflected by the reflective substrate formed by the inner coating or reflective base particle, without the adverse effect on color provided by the nano-sized color pigments in the outer coating. Furthermore, when selected nano-sized color pigments are dispersed in a metal-silicate binder and applied over a white, titanium dioxide pigmented base coat, enhanced colors or metallic effects are provided. In addition, nano-sized color pigments can be selected to provide additional surface functionalities, such as algaecidal and/or photo-catalytic effects. In preparing outer coating compositions according to this aspect of the present invention, in addition to nano-sized color-pigment, the outer coating composition can include other colorants to produce desirable-colors. In particular, outer coating compositions can include both nano-sized color pigments and pigments of high NIR transparency and/or pigments of high IR reflectivity to produce colored roofing granules with high solar reflectance. Preferably, the binder employed in the other coating composition including nano-sized color pigment is a metal-silicate binder that has reduced refractive index to further enhance their color and solar reflectance. The nano-sized color pigments preferably have particle sizes in the range from about 20 nm and 150 nm and should have adequate light-fastness for exterior applications.

Examples of nano-sized color pigments include, but are not limited to, iron oxides, titanates, chrome oxides, zinc ferrites, mixed metal oxides, titanium dioxides, zinc oxides, copper oxides, vanadium dioxides, magnesium oxides and the halogen adducts, etc. Such nano-sized colorants can be dispersed in a binder system through various means to form a durable color coating suitable for roofing granule applications. Many so-called "hot pigments" in the database established by LBL Lab, that is, those pigments with significant absorption in the solar radiation, can become effective "cool pigments" when their sizes are reduced into the nano-sized pigment range.

To prepare solar-reflective roofing granules according to this aspect of the present invention, inert mineral core particles can be coated using a first or inner coating composition having binder formed from a metal-silicate and kaolin clay in which is dispersed a highly solar-radiation-reflective white pigment, such as rutile titanium dioxide to form a first or inner coating layer on the mineral core particles. The first or inner coating composition is then cured by heating the coated mineral core particles at an elevated temperature to render the binder insoluble to form a cured white-pigmented, solar reflective inner coating layer on the mineral core particles. It is preferred that the white-pigmented inner coating result provide a particulate with solar reflectance greater than 40% as measured by the ASTM C1549 method. Secondly, the granules with white-pigmented inner coating are then preferably coated with a second or outer coating of nano-sized colorants dispersed in a metal-silicate binder without the presence of clay. The second or outer coating composition can also include other color pigments, IR reflective pigments, IR reflective fillers, and/or other functional additives. The roofing granules with the second coating are then again heated at an elevated temperature to cure the second coating composition. In addition, latent reactants may also be included in the second coating composition. In addition, or in the alternative, or the process of acid wash (pickling) may be used to further improve the durability of the said granules. The resulting roofing granules can then be surface-treated such as disclosed in U.S. Pat. No. 5,484,477 to provide desirable surface functionalities, and subsequently can be used in a conventional process for making asphalt shingles.

Advantageously, intermediate particles produced according to one of the embodiments of the present invention described above can be coated with different outer coating compositions if desired. For example, intermediate particles prepared according to the third embodiment have a first or inner coating comprising highly reflective nanoparticles, and a second or outer coating composition comprising nano-pigment colorants. Thus, a batch of intermediate particles can be divided into two or more sub-batches, and each sub-batch can be coated with outer coating compositions comprising different nano-pigment colorants, such as blue nano-pigment colorants, green nano-pigment colorants, red nano-pigment colorants, and the like, to provide roofing granules having a variety of different colors. Similarly, intermediate particles prepared according to the sixth embodiment can be divided into sub-batches, each of which can be coated with an outer coating composition comprising a different colored nano-pigment, a different supplementary pigment, or a different combination of colored nano-pigment and supplementary pigment, to provide colored roofing granules of differing appearance.

The present invention also provides a process for increasing the infrared or solar heat reflectance of conventional colored roofing granules. Conventional colored roofing granules are coated with a coating composition including a coating binder and at least one solar heat-reflective nanoparticle, such as solar heat-reflective titanium dioxide nanoparticles having an average crystal size less than about 100 nanometers, and preferably having an average crystal size less than about 50 nanometers. Preferably, the near-infrared reflectance of the conventional colored roofing granules is increased by at least about 20 percent, more preferably at least about 25 percent, while substantially maintaining the color of the roofing granules, such that the value of the total color difference $\Delta E^*$ is no more than 10 units, more preferably no more than 5 units, and even more preferably no more than 3 units.

The process of the present invention for producing near infrared-reflective roofing granules comprises several steps. In one step of the present process, suitable base particles are provided. These can be suitably sized, chemically inert, mineral particles. In some embodiments of the present invention, these base or core particles are selected from materials having a high near infrared reflectance. In one aspect of the present invention, the base particles are coated with an initial coating composition containing at least one conventional roofing granule pigment such as a metal oxide and/or at least one colored nano-pigment to form intermediate particles with an inner or first coating layer on the base particles. These intermediate particles are then provided with a second or outer coating layer providing near infrared-reflectance, but which is substantially transparent in the visible region of the electromagnetic spectrum, such as a coating layer in which are dispersed nanoparticles of titanium dioxide, or one or more layers of a suitable metal film. In another aspect of the present invention, the base or core particles are coated with an initial coating composition including a highly near-infrared reflective pigment, such as titanium dioxide nano-particles to form intermediate particles. The intermediate particles are then coated using a second coating composition including a binder, and at least one color nano-pigment to provide an outer coating layer that is substantially transparent in the near infrared portion of the spectrum, while absorbing in the visible portion of the spectrum to provide the desired color to the roofing granules. In yet another aspect of the present invention, both colored nano-pigment particles and near infrared-reflecting nanoparticles such as titanium dioxide nanoparticles are dispersed in a single coating composition, and the coating composition is applied to suitable base or core mineral particles and cured to provide a coating layer including both colored nano-pigment particles and near-infrared reflecting nanoparticles such as titanium dioxide nanoparticles.

Preferably, the at least one infrared-reflective pigment comprises from about 1 percent by weight to about 60 percent by weight of the coating composition. It is preferred that the coating composition comprises from about 2 percent by weight of the base particles to about 20 percent by weight of the base particles. More preferably, the coating composition comprises from about 4 percent by weight of the base particles to about 10 percent by weight of the base particles. The coating composition is cured to provide a layer of near infrared-reflective coating material.

Preferably, the near infrared-reflective coating is provided in a thickness effective to render the coating opaque to infrared radiation, such as a coating thickness of at least about 100 micrometers. However, advantageous properties of the present invention can be realized with significantly lower coating thicknesses, such as at a coating thickness of from about 2 micrometers to about 25 micrometers, including at a coating thickness of about 5 micrometers.

Preferably, the at least one colored nano-pigment comprises from about 0.5 percent by weight to about 40 percent by weight of the coating composition in which the at least one colored nano-pigment is dispersed. It is also preferred that this coating composition comprises from about 2 percent by weight of the inert mineral particles to about 20 percent by weight of the inert mineral particles. Preferably, this coating composition forms a layer having sufficient thickness to provide good hiding and opacity in the visible range of the electromagnetic spectrum, such as a thickness of from about 5 micrometers to about 50 micrometers.

The solar heat reflectance properties of the solar heat-reflective roofing granules of the present invention are determined by a number of factors, including the type and concentration of the solar heat-reflective pigment(s) used in the solar heat-reflective coating composition, whether a base coating is employed, and if so, the type and concentration of the reflective pigment employed in the base coating, the nature of the binder(s) used in for the solar heat-reflective coating and the base coating, the number of coats of solar heat-reflective coating employed, the thickness of the solar heat-reflective coating layer and the base coating layer, and the size and shape of the base particles.

The present invention provides mineral surfaced asphalt shingles with L* less than 85, and more preferably less than 55, and solar reflectance greater than 25%. Preferably, asphalt shingles according to the present invention comprise colored, infrared-reflective granules according to the present invention, and optionally, conventional colored roofing granules. Conventional colored roofing granules and infrared-reflective roofing granules can be blended in combinations to generate desirable colors. The blend of granules is then directly applied on to hot asphalt coating to form the shingle. Examples of granule deposition apparatus that can be employed to manufacture asphalt shingles according to the present invention are provided, for example, in U.S. Pat. Nos. 4,583,486, 5,795,389, and 6,610,147, and U.S. Patent Application Publication U.S. 2002/0092596.

The colored, solar heat-reflective roofing granules prepared according to the present invention can be employed in the manufacture of solar heat-reflective roofing products, such as solar heat-reflective asphalt shingles, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The colored, solar heat-reflective granules of the present invention can be mixed with conventional roofing granules, and the granule mixture can be embedded in the surface of such bituminous roofing products using conventional methods. Alternatively, the colored, solar heat-reflective granules of the present invention can be substituted for conventional roofing granules in manufacture of bituminous roofing products to provide those roofing products with solar reflectance.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation, additional bituminous adhesive can be applied in strategic locations on the top or bottom of the shingles and covered with release paper, strips or tape to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

Example 1

1000 g of #93 roofing granules without any surface treatment (available from CertainTeed Corp. Norwood, Mass.) is first blended with 36.25 g of sodium silicate (grade 42, Oxychem Corp., Dallas, Tex.), 12.5 g of titanium dioxide (R101 from DuPont Corp. Wilmington, Del.), 12.5 g of kaolin clay, and 8.2 g of water in a tumbler to form a uniform coating on the roofing granules. The coated granules were then dried in a fluidized bed and were heated to 925 degrees F. in a rotary kiln to insolubilize the coating. After cooling to room temperature, the granules have a white appearance with L*=75.16, a*=−0.33, b*=1.93 as measured by HunterLab XE spectrophotometer, and a solar reflectance of 44% as measured by the D&S portable reflectometer according to ASTM C1549. The granules were then coated with a second coating composition consisting of nano-sized iron oxide pigments of 0.025 g T-3070B, 0.1 g T-2050R, and 0 46 g T-1030Y from Novant Chemicals, 31.25 g of sodium silicate, 2.8 g of aluminum fluoride, 0 812 g of sodium silicofluoride, and 7.0 g of water. The second coating composition was cured at a temperature of 450~475 degrees F. The final granules have a color reading of $L^*=61.34$, $a^*=13.06$ $b^*=23.17$, and a high solar reflectance of 35%, as compared to roofing granules made from traditional process having a solar reflectance of 20-25% in the similar color range. The finished granules also have a very desirable metallic effect.

Examples 2-4b

The transparency of the nano-sized color pigments in the spectrum range of the solar radiation employed in the coating compositions of the present invention is shown using the drawdown method typically used in the coating industry. Results are displayed in Table 2, in which the effect of employing nano-sized iron oxide pigments in the roofing granule coating composition is compared with the use of traditional iron oxide pigments using coating drawdown method. In these examples, 2 g of pigment was mixed with 20 g of sodium silicate under an electric stirrer at 300 rpm until a uniform mixture was formed. The resultant coating slurry was then formed into a film using a 6 mil drawdown bar (SAR-5T30 from BYK Gardner, Columbia, Md.) over an opacity chart paper (SAR-3721 from BYK Gardner). The results in Table 1 clearly show the transparency of nano-sized pigments and their high solar reflectance over white reflective background, with enhanced color values in combination of white background. However, the same type of iron oxide pigments with larger particle sizes as in the traditional pigments have good hiding powder but result in low solar reflectance.

TABLE 2

| Example or Comparative Example | Pigment | Substrate | L* | a* | b* | Solar reflectance |
| --- | --- | --- | --- | --- | --- | --- |
| Comp. Ex. 1a | Control - standard iron oxide brown (I-4650 from Rockwood) | Black | 12.05 | 11.70 | 12.90 | 9.1% |
| Comp. Ex 1b | Control - standard iron oxide brown (I-4650 from Rockwood) | White | 11.98 | 11.61 | 112.06 | 13.4% |
| Comp. Ex. 2a | Control - standard iron oxide red pigment (120N from Bayer Corp.) | Black | 32.17 | 39.06 | 33.13 | 27.7% |
| Comp. Ex. 2b | Control - standard iron oxide red pigment (120N from Bayer Corp.) | White | 32.06 | 39.12 | 33.36 | 37.6% |
| Example 2a | Nano pigment - iron oxide red;T-2050R from Novant Chemicals | Black | 17.38 | 18.41 | 9.58 | 11.6% |
| Example 2b | Nano pigment - iron oxide red; T-2050R from Novant Chemicals | White | 20.01 | 22.24 | 11.26 | 32.3% |
| Example 3a | Nano pigment - iron oxide brown;T-3070B from Novant Chemicals | Black | 22.02 | 15.87 | 16.24 | 9.4% |
| Example 3b | Nano pigment - iron oxide brown;T-3070B from Novant Chemicals | White | 33.44 | 29.44 | 30.70 | 38.1% |
| Example 4a | Nano pigment - iron oxide yellow; T-1030Y from Novant Chemicals | Black | 25.58 | 10.12 | 20.3 | 8.7% |
| Example 4b | Nano pigment - iron oxide yellow; T-1030Y from Novant Chemicals | White | 47.29 | 30.09 | 54.598 | 40.8% |

Various modifications can be made in the details of the various embodiments of the processes, compositions and articles of the present invention, all within the scope and spirit of the invention and defined by the appended claims.

We claim:
1. Solar heat-reflective roofing granules comprising:
   (a) a base particle comprising an inert mineral;
   (b) a first white coating on the base particle, and
   (c) a second colored coating on the first coating, wherein
   the first white coating comprises a first coating binder and particles of at least one solar reflecting white pigment having an average reflectance of greater than about 60 percent in the wavelength range of from about 700 to 2500 nanometers, and the second colored coating comprises a second coating binder and at least one colored nano-pigment having an average particle size of less than about 200 nanometers, an average absorbency of less than about 20 percent in the wavelength range of from 700 to 2500 nanometers, and an L* value of less than 85, the at least one colored nano-pigment being selected from the group consisting of iron oxides, metal titanates, chromium oxides, zinc ferrites, mixed metal oxides, copper oxides, vanadium oxide, magnesium oxide and the halogen adducts, the solar heat-reflective roofing granules have an L* of less than 55.

2. Solar heat-reflective roofing granules according to claim 1 wherein the solar reflecting white pigment particles have an average solar reflectivity of at least 80 percent in the wavelength range from 700 to 2500 nanometers.

3. Solar heat-reflective roofing granules according to claim 1 wherein the solar reflecting pigment white particles are selected from the group consisting of titanium dioxide, zinc dioxide, and zinc sulfide.

4. Solar heat-reflective roofing granules according to claim 1 wherein the second coating binder comprises a metal silicate binder having a refractive index of less than 1.50, the silicate coating binder including at least one low atomic weight element, other than oxygen or hydrogen, having an average atomic weight less than the average atomic weight of silicon, the at least one low atomic weight element being present in sufficient amount in the coating binder to reduce the refractive index of the binder by at least about 0.003 units.

5. Solar heat-reflective roofing granules according to claim 1, the second coating further comprising at least one supplementary pigment having a particle size of greater than about 200 nanometers an average absorbency of less than about 20 percent in the wavelength range of from 700 to 2500 nanometers.

6. Solar heat-reflective roofing granules according to claim 5 wherein the at least one supplementary pigment is selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, phthalo blue, phthalo green, quinacridone red, diarylide yellow, and dioxazine purple.

7. Solar heat-reflective roofing granules according to claim 1 wherein the at least one colored nano-pigment has an average particle size of from about 20 to 150 nanometers.

8. Solar heat-reflective roofing granules according to claim 7 wherein the at least one colored nano-pigment is selected from the group consisting of iron oxides, metal titanates, chromium oxides, zinc ferrites, mixed metal oxides, titanium dioxide, zinc oxides, and copper oxides.

9. Solar heat-reflective roofing granules according to claim 1 wherein the at least one colored nano-pigment is selected from the group of pigments that have strong near infrared absorbency in macro-pigment form.

10. Solar heat-reflective roofing granules according to claim 1 wherein the at least one colored nano-pigment is selected from the group consisting of bone black, copper chromite black, iron oxide black, and $KFe_2(CN)_6 \cdot H_2O$.

11. Solar heat-reflective roofing granules comprising:
(a) a solar-reflective white inert base particle having a solar reflectivity of at least 60 percent; and (b) a colored coating over the base particle, the coating comprising a binder and at least one colored nano-pigment having an average particle size of less than about 200 nanometers, an average absorbency of less than about 20 percent in the wavelength range of from 700 to 2500 nanometers, and an L* value of less than 85, the at least one colored nano-pigment being selected from the group consisting of iron oxides, metal titanates, chromium oxides, zinc ferrites, mixed metal oxides, copper oxides, vanadium oxide, magnesium oxide and the halogen adducts, wherein the solar heat-reflective roofing granules have an L* of less than 55.

12. Solar heat-reflective roofing granules according to claim 11 wherein the solar-reflective inert base particles are selected from the group consisting of aluminum oxide, ceramic grog, crushed porcelain, and white-pigmented glass.

13. Solar heat-reflective roofing granules according to claim 11 wherein the coating binder comprises a metal silicate binder having a refractive index of less than 1.50, the silicate coating binder including at least one low atomic weight element, other than oxygen or hydrogen, having an average atomic weight less than the average atomic weight of silicon, the at least one low atomic weight element being present in sufficient amount in the coating binder to reduce the refractive index of the binder by at least about 0.003 units.

14. Solar heat-reflective roofing granules according to claim 11, the coating further comprising at least one supplementary pigment having a particle size of greater than about 200 nanometers and an average absorbency of less than about 20 percent in the wavelength range of from 700 to 2500 nanometers.

15. Solar heat-reflective roofing granules according to claim 14 wherein the at least one supplementary pigment is selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, phthalo blue, phthalo green, quinacridone red, diarylide yellow, and dioxazine purple.

16. Solar heat-reflective roofing granules according to claim 11 wherein the at least one colored nano-pigment has an average particle size of from about 20 to 150 nanometers.

17. Solar heat-reflective roofing granules according to claim 16 wherein the at least one colored nano-pigment is selected from the group consisting of iron oxides, metal titanates, chromium oxides, zinc ferrites, mixed metal oxides, titanium dioxide, zinc oxides, and copper oxides.

18. Solar heat-reflective roofing granules according to claim 11 wherein the at least one colored nano-pigment is selected from the group of pigments that have strong near infrared absorbency in macro-pigment form.

19. Solar heat-reflective roofing granules according to claim 11 wherein the at least one colored nano-pigment is selected from the group consisting of bone black, copper chromite black, iron oxide black, and $KFe_2(CN)_6 \cdot H_2O$.

20. Solar heat-reflective roofing granules according to claim 1, wherein the second colored coating is free of titanium dioxide and zinc oxide.

* * * * *